United States Patent
Svendsen et al.

(10) Patent No.: US 8,060,525 B2
(45) Date of Patent: Nov. 15, 2011

(54) METHOD AND SYSTEM FOR GENERATING MEDIA RECOMMENDATIONS IN A DISTRIBUTED ENVIRONMENT BASED ON TAGGING PLAY HISTORY INFORMATION WITH LOCATION INFORMATION

(75) Inventors: Hugh Svendsen, Chapel Hill, NC (US); Eugene M. Farrelly, Cary, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 644 days.

(21) Appl. No.: 11/963,050

(22) Filed: Dec. 21, 2007

(65) Prior Publication Data
US 2009/0164516 A1 Jun. 25, 2009

(51) Int. Cl.
*G06F 17/30* (2006.01)
(52) U.S. Cl. .......... 707/769; 707/912; 707/916
(58) Field of Classification Search .......... 707/758, 707/999.107
See application file for complete search history.

(56) References Cited

U.S. PATENT DOCUMENTS

| | | | |
|---|---|---|---|
| 4,870,579 A | 9/1989 | Hey | |
| 5,621,456 A | 4/1997 | Florin et al. | |
| 5,771,778 A | 6/1998 | MacLean, IV | |
| 5,956,027 A | 9/1999 | Krishnamurthy | |
| 5,960,437 A | 9/1999 | Krawchuk et al. | |
| 5,963,916 A | 10/1999 | Kaplan | |
| 6,134,552 A | 10/2000 | Fritz et al. | |
| 6,195,657 B1 | 2/2001 | Rucker et al. | |
| 6,266,649 B1 | 7/2001 | Linden et al. | |
| 6,314,420 B1 | 11/2001 | Lang et al. | |
| 6,317,722 B1 | 11/2001 | Jacobi et al. | |
| 6,353,823 B1 | 3/2002 | Kumar | |
| 6,388,714 B1 | 5/2002 | Schein et al. | |
| 6,438,579 B1 * | 8/2002 | Hosken | 709/203 |
| 6,438,759 B1 | 8/2002 | Hosken | |
| 6,498,955 B1 | 12/2002 | McCarthy et al. | |
| 6,526,411 B1 | 2/2003 | Ward | |

(Continued)

FOREIGN PATENT DOCUMENTS

CN 1208930 A 2/1999
(Continued)

OTHER PUBLICATIONS

Last.fm, From Wikipedia, the free encyclopedia, http://en.wikipedia.org/wiki/Last.fm, pp. 1-12, Aug. 31, 2007.

(Continued)

*Primary Examiner* — Hung Q Pham
(74) *Attorney, Agent, or Firm* — Withrow & Terranova, PLLC

(57) ABSTRACT

A computer-implemented method and system are provided for generating media recommendations in a media recommendation network. Aspects of the method and system include receiving by a server a plurality of play histories of media items from a plurality of users of devices, wherein at least a portion of the media items are tagged with corresponding time and location data indicating a time and location of play; receiving by the server a media recommendation request from a requester, including receiving seed information indicating a current location of the requester; using at least one of user preferences of the requester and the seed information to identify correlated users from which to search corresponding play histories from among the plurality of play histories; comparing the seed information to the corresponding play histories and generating a list of related media items contained therein; and returning the list of related media items to the requester.

36 Claims, 8 Drawing Sheets

U.S. PATENT DOCUMENTS

| | | | |
|---|---|---|---|
| 6,567,797 B1 | 5/2003 | Schuetze et al. | |
| 6,587,127 B1 | 7/2003 | Leeke et al. | |
| 6,587,850 B2 | 7/2003 | Zhai | |
| 6,609,253 B1 | 8/2003 | Swix et al. | |
| 6,615,208 B1 | 9/2003 | Behrens et al. | |
| 6,629,104 B1 | 9/2003 | Parulski et al. | |
| 6,636,836 B1 * | 10/2003 | Pyo | 705/26 |
| 6,654,786 B1 | 11/2003 | Fox et al. | |
| 6,662,231 B1 | 12/2003 | Drosset et al. | |
| 6,670,537 B2 | 12/2003 | Hughes et al. | |
| 6,694,482 B1 | 2/2004 | Arellano et al. | |
| 6,757,517 B2 | 6/2004 | Chang | |
| 6,757,691 B1 | 6/2004 | Welsh et al. | |
| 6,801,909 B2 | 10/2004 | Delgado et al. | |
| 6,865,565 B2 | 3/2005 | Rainsberger et al. | |
| 6,904,264 B1 | 6/2005 | Frantz | |
| 6,912,528 B2 | 6/2005 | Homer | |
| 6,941,275 B1 | 9/2005 | Swierczek | |
| 6,941,324 B2 | 9/2005 | Plastina et al. | |
| 6,947,922 B1 | 9/2005 | Glance | |
| 6,973,475 B2 | 12/2005 | Kenyon et al. | |
| 6,976,228 B2 | 12/2005 | Bernhardson | |
| 6,986,136 B2 | 1/2006 | Simpson et al. | |
| 6,987,221 B2 | 1/2006 | Platt | |
| 6,990,453 B2 | 1/2006 | Wang et al. | |
| 7,013,301 B2 | 3/2006 | Holm et al. | |
| 7,035,871 B2 | 4/2006 | Hunt et al. | |
| 7,047,406 B2 | 5/2006 | Schleicher et al. | |
| 7,072,846 B1 | 7/2006 | Robinson | |
| 7,072,886 B2 | 7/2006 | Salmenkaita et al. | |
| 7,075,000 B2 | 7/2006 | Gang et al. | |
| 7,076,553 B2 | 7/2006 | Chan et al. | |
| 7,089,248 B1 | 8/2006 | King et al. | |
| 7,096,234 B2 | 8/2006 | Plastina et al. | |
| 7,120,619 B2 | 10/2006 | Drucker et al. | |
| 7,139,757 B1 | 11/2006 | Apollonsky et al. | |
| 7,145,678 B2 | 12/2006 | Simpson et al. | |
| 7,171,174 B2 | 1/2007 | Ellis et al. | |
| 7,177,872 B2 | 2/2007 | Schwesig et al. | |
| 7,219,145 B2 | 5/2007 | Chmaytelli et al. | |
| 7,222,187 B2 | 5/2007 | Yeager et al. | |
| 7,240,358 B2 | 7/2007 | Horn et al. | |
| 7,283,992 B2 | 10/2007 | Liu et al. | |
| 7,296,032 B1 | 11/2007 | Beddow | |
| 7,305,449 B2 | 12/2007 | Simpson et al. | |
| 7,340,481 B1 | 3/2008 | Baer et al. | |
| 7,437,364 B1 | 10/2008 | Fredricksen et al. | |
| 7,441,041 B2 | 10/2008 | Williams et al. | |
| 7,444,339 B2 | 10/2008 | Matsuda et al. | |
| 7,463,890 B2 | 12/2008 | Herz et al. | |
| 7,469,283 B2 | 12/2008 | Eyal et al. | |
| 7,496,623 B2 | 2/2009 | Szeto et al. | |
| 7,509,291 B2 | 3/2009 | McBride et al. | |
| 7,512,658 B2 | 3/2009 | Brown et al. | |
| 7,548,915 B2 | 6/2009 | Ramer et al. | |
| 7,590,546 B2 | 9/2009 | Chuang | |
| 7,594,246 B1 | 9/2009 | Billmaier et al. | |
| 7,614,006 B2 | 11/2009 | Molander | |
| 7,623,843 B2 | 11/2009 | Squibbs | |
| 7,627,644 B2 | 12/2009 | Slack-Smith | |
| 7,644,166 B2 | 1/2010 | Appelman et al. | |
| 7,653,654 B1 | 1/2010 | Sundaresan | |
| 7,676,753 B2 | 3/2010 | Bedingfield | |
| 7,680,959 B2 | 3/2010 | Svendsen | |
| 7,720,871 B2 | 5/2010 | Rogers et al. | |
| 7,725,494 B2 | 5/2010 | Rogers et al. | |
| 7,730,216 B1 | 6/2010 | Issa et al. | |
| 7,751,773 B2 | 7/2010 | Linden | |
| 7,761,399 B2 | 7/2010 | Evans | |
| 7,805,129 B1 | 9/2010 | Issa et al. | |
| 7,827,110 B1 | 11/2010 | Wieder | |
| 7,865,522 B2 | 1/2011 | Purdy et al. | |
| 7,970,922 B2 | 6/2011 | Svendsen | |
| 2001/0013009 A1 | 8/2001 | Greening et al. | |
| 2001/0021914 A1 | 9/2001 | Jacobi et al. | |
| 2001/0025259 A1 | 9/2001 | Rouchon | |
| 2002/0052207 A1 | 5/2002 | Hunzinger | |
| 2002/0052674 A1 | 5/2002 | Chang et al. | |
| 2002/0052873 A1 | 5/2002 | Delgado et al. | |
| 2002/0082901 A1 | 6/2002 | Dunning et al. | |
| 2002/0087382 A1 | 7/2002 | Tiburcio | |
| 2002/0103796 A1 | 8/2002 | Hartley | |
| 2002/0108112 A1 | 8/2002 | Wallace et al. | |
| 2002/0116533 A1 | 8/2002 | Holliman et al. | |
| 2002/0138836 A1 | 9/2002 | Zimmerman | |
| 2002/0165793 A1 | 11/2002 | Brand et al. | |
| 2002/0178057 A1 | 11/2002 | Bertram et al. | |
| 2002/0194325 A1 | 12/2002 | Chmaytelli et al. | |
| 2002/0194356 A1 | 12/2002 | Chan et al. | |
| 2003/0001907 A1 | 1/2003 | Bergsten et al. | |
| 2003/0005074 A1 | 1/2003 | Herz et al. | |
| 2003/0014407 A1 | 1/2003 | Blatter et al. | |
| 2003/0018799 A1 | 1/2003 | Eyal | |
| 2003/0046399 A1 | 3/2003 | Boulter et al. | |
| 2003/0055516 A1 | 3/2003 | Gang et al. | |
| 2003/0055657 A1 | 3/2003 | Yoshida et al. | |
| 2003/0066068 A1 | 4/2003 | Gutta et al. | |
| 2003/0069806 A1 | 4/2003 | Konomi et al. | |
| 2003/0084044 A1 | 5/2003 | Simpson et al. | |
| 2003/0084086 A1 | 5/2003 | Simpson et al. | |
| 2003/0084151 A1 | 5/2003 | Simpson et al. | |
| 2003/0089218 A1 | 5/2003 | Gang et al. | |
| 2003/0097186 A1 | 5/2003 | Gutta et al. | |
| 2003/0115167 A1 | 6/2003 | Sharif et al. | |
| 2003/0135513 A1 | 7/2003 | Quinn et al. | |
| 2003/0137531 A1 | 7/2003 | Katinsky et al. | |
| 2003/0149581 A1 | 8/2003 | Chaudhri et al. | |
| 2003/0149612 A1 | 8/2003 | Berghofer et al. | |
| 2003/0153338 A1 | 8/2003 | Herz et al. | |
| 2003/0160770 A1 | 8/2003 | Zimmerman | |
| 2003/0191753 A1 | 10/2003 | Hoch | |
| 2003/0229537 A1 | 12/2003 | Dunning et al. | |
| 2003/0232614 A1 | 12/2003 | Squibbs | |
| 2003/0236582 A1 | 12/2003 | Zamir et al. | |
| 2003/0237093 A1 | 12/2003 | Marsh | |
| 2004/0003392 A1 | 1/2004 | Trajkovic et al. | |
| 2004/0019497 A1 | 1/2004 | Volk et al. | |
| 2004/0034441 A1 | 2/2004 | Eaton et al. | |
| 2004/0073919 A1 * | 4/2004 | Gutta et al. | 725/35 |
| 2004/0088271 A1 | 5/2004 | Cleckler | |
| 2004/0091235 A1 | 5/2004 | Gutta | |
| 2004/0107821 A1 | 6/2004 | Alcalde et al. | |
| 2004/0128286 A1 | 7/2004 | Yasushi et al. | |
| 2004/0133657 A1 | 7/2004 | Smith et al. | |
| 2004/0133908 A1 | 7/2004 | Smith et al. | |
| 2004/0133914 A1 | 7/2004 | Smith et al. | |
| 2004/0162783 A1 | 8/2004 | Gross | |
| 2004/0162830 A1 | 8/2004 | Shirwadkar et al. | |
| 2004/0181540 A1 | 9/2004 | Jung et al. | |
| 2004/0186733 A1 | 9/2004 | Loomis et al. | |
| 2004/0199527 A1 | 10/2004 | Morain et al. | |
| 2004/0215793 A1 | 10/2004 | Ryan et al. | |
| 2004/0216108 A1 | 10/2004 | Robbin | |
| 2004/0224638 A1 | 11/2004 | Fadell et al. | |
| 2004/0252604 A1 | 12/2004 | Johnson et al. | |
| 2004/0254911 A1 | 12/2004 | Grasso et al. | |
| 2004/0260778 A1 | 12/2004 | Banister et al. | |
| 2004/0267604 A1 | 12/2004 | Gross | |
| 2005/0020223 A1 | 1/2005 | Ellis et al. | |
| 2005/0021420 A1 | 1/2005 | Michelitsch et al. | |
| 2005/0021470 A1 | 1/2005 | Martin et al. | |
| 2005/0021678 A1 | 1/2005 | Simyon et al. | |
| 2005/0022239 A1 | 1/2005 | Meuleman | |
| 2005/0026559 A1 | 2/2005 | Khedouri | |
| 2005/0038819 A1 | 2/2005 | Hicken et al. | |
| 2005/0038876 A1 | 2/2005 | Chaudhuri | |
| 2005/0060264 A1 | 3/2005 | Schrock et al. | |
| 2005/0060666 A1 | 3/2005 | Hoshino et al. | |
| 2005/0065976 A1 | 3/2005 | Holm et al. | |
| 2005/0071418 A1 | 3/2005 | Kjellberg et al. | |
| 2005/0091107 A1 | 4/2005 | Blum | |
| 2005/0120053 A1 | 6/2005 | Watson | |
| 2005/0125221 A1 | 6/2005 | Brown et al. | |
| 2005/0125222 A1 | 6/2005 | Brown et al. | |
| 2005/0131866 A1 | 6/2005 | Badros | |
| 2005/0138198 A1 | 6/2005 | May | |
| 2005/0154608 A1 | 7/2005 | Paulson et al. | |

| | | |
|---|---|---|
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085349 A1* | 4/2006 | Hug .................... 705/57 |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1* | 12/2006 | Chung et al. .................... 705/14 |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0174147 A1* | 7/2007 | Klein, Jr. .................... 705/28 |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0233743 A1* | 10/2007 | Rosenberg ................ 707/104.1 |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0282949 A1 | 12/2007 | Fischer et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052380 A1 | 2/2008 | Morita et al. |
| 2008/0052630 A1 | 2/2008 | Rosenbaum |
| 2008/0059422 A1 | 3/2008 | Tenni et al. |
| 2008/0059576 A1 | 3/2008 | Liu et al. |
| 2008/0085769 A1 | 4/2008 | Lutnick et al. |
| 2008/0091771 A1* | 4/2008 | Allen et al. .................... 709/203 |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0162435 A1* | 7/2008 | Dooms et al. .................... 707/3 |
| 2008/0176562 A1 | 7/2008 | Howard |
| 2008/0181536 A1 | 7/2008 | Linden |
| 2008/0189336 A1 | 8/2008 | Prihodko |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0209013 A1 | 8/2008 | Weel |

| | | | |
|---|---|---|---|
| 2008/0228945 A1 | 9/2008 | Yoon et al. | |
| 2008/0235632 A1 | 9/2008 | Holmes | |
| 2008/0242221 A1 | 10/2008 | Shapiro et al. | |
| 2008/0242280 A1 | 10/2008 | Shapiro et al. | |
| 2008/0243733 A1 | 10/2008 | Black | |
| 2008/0244681 A1 | 10/2008 | Gossweiler et al. | |
| 2008/0250067 A1 | 10/2008 | Svendsen | |
| 2008/0250312 A1 | 10/2008 | Curtis | |
| 2008/0250332 A1 | 10/2008 | Farrell et al. | |
| 2008/0261516 A1* | 10/2008 | Robinson | 455/3.06 |
| 2008/0270561 A1 | 10/2008 | Tang et al. | |
| 2008/0276279 A1 | 11/2008 | Gossweiler et al. | |
| 2008/0288588 A1 | 11/2008 | Andam et al. | |
| 2008/0301118 A1 | 12/2008 | Chien et al. | |
| 2008/0301186 A1 | 12/2008 | Svendsen | |
| 2008/0301187 A1 | 12/2008 | Svendsen | |
| 2008/0301240 A1 | 12/2008 | Svendsen | |
| 2008/0301241 A1 | 12/2008 | Svendsen | |
| 2008/0306826 A1 | 12/2008 | Kramer et al. | |
| 2008/0307462 A1 | 12/2008 | Beetcher et al. | |
| 2008/0307463 A1 | 12/2008 | Beetcher et al. | |
| 2008/0313541 A1 | 12/2008 | Shafton et al. | |
| 2008/0319833 A1 | 12/2008 | Svendsen | |
| 2009/0006368 A1 | 1/2009 | Mei et al. | |
| 2009/0006374 A1 | 1/2009 | Kim et al. | |
| 2009/0007198 A1 | 1/2009 | Lavender et al. | |
| 2009/0013347 A1 | 1/2009 | Ahanger et al. | |
| 2009/0042545 A1 | 2/2009 | Avital et al. | |
| 2009/0046101 A1 | 2/2009 | Askey et al. | |
| 2009/0048992 A1 | 2/2009 | Svendsen et al. | |
| 2009/0049030 A1 | 2/2009 | Svendsen et al. | |
| 2009/0049045 A1 | 2/2009 | Askey et al. | |
| 2009/0055376 A1* | 2/2009 | Slaney et al. | 707/5 |
| 2009/0055385 A1 | 2/2009 | Jeon et al. | |
| 2009/0055396 A1 | 2/2009 | Svendsen et al. | |
| 2009/0055467 A1 | 2/2009 | Petersen | |
| 2009/0055759 A1 | 2/2009 | Svendsen | |
| 2009/0063971 A1* | 3/2009 | White et al. | 715/716 |
| 2009/0069911 A1 | 3/2009 | Stefik | |
| 2009/0069912 A1 | 3/2009 | Stefik | |
| 2009/0070184 A1 | 3/2009 | Svendsen | |
| 2009/0070350 A1 | 3/2009 | Wang | |
| 2009/0076881 A1 | 3/2009 | Svendsen | |
| 2009/0077041 A1 | 3/2009 | Eyal et al. | |
| 2009/0077052 A1 | 3/2009 | Farrelly | |
| 2009/0077124 A1 | 3/2009 | Spivack et al. | |
| 2009/0077220 A1 | 3/2009 | Svendsen et al. | |
| 2009/0083116 A1 | 3/2009 | Svendsen | |
| 2009/0083117 A1 | 3/2009 | Svendsen et al. | |
| 2009/0083362 A1 | 3/2009 | Svendsen | |
| 2009/0083541 A1 | 3/2009 | Levine | |
| 2009/0089288 A1 | 4/2009 | Petersen | |
| 2009/0093300 A1 | 4/2009 | Lutnick et al. | |
| 2009/0094248 A1 | 4/2009 | Petersen | |
| 2009/0119294 A1 | 5/2009 | Purdy et al. | |
| 2009/0125588 A1 | 5/2009 | Black et al. | |
| 2009/0129671 A1 | 5/2009 | Hu et al. | |
| 2009/0132527 A1 | 5/2009 | Sheshagiri et al. | |
| 2009/0157795 A1 | 6/2009 | Black | |
| 2009/0164199 A1 | 6/2009 | Amidon et al. | |
| 2009/0164514 A1 | 6/2009 | Svendsen et al. | |
| 2009/0164641 A1 | 6/2009 | Rogers et al. | |
| 2009/0177301 A1 | 7/2009 | Hayes | |
| 2009/0259621 A1 | 10/2009 | Svendsen et al. | |
| 2010/0031366 A1 | 2/2010 | Knight et al. | |
| 2010/0185732 A1 | 7/2010 | Hyman | |
| 2011/0016483 A1 | 1/2011 | Opdycke | |
| 2011/0034121 A1 | 2/2011 | Ng et al. | |

FOREIGN PATENT DOCUMENTS

| | | | |
|---|---|---|---|
| EP | 0898278 | A2 | 2/1999 |
| EP | 1536352 | A1 | 6/2005 |
| EP | 1835455 | A1 | 9/2007 |
| GB | 2372850 | A | 9/2002 |
| GB | 2397205 | A | 7/2004 |
| JP | 2005321668 | | 11/2005 |
| WO | 0184353 | A3 | 11/2001 |
| WO | 0221335 | A1 | 3/2002 |
| WO | 2004017178 | A2 | 2/2004 |
| WO | 2004043064 | A1 | 5/2004 |
| WO | 2005026916 | A2 | 3/2005 |
| WO | 2005071571 | A1 | 8/2005 |
| WO | 2006/075032 | A1 | 7/2006 |
| WO | 2006126135 | A2 | 11/2006 |
| WO | 2007/092053 | A1 | 8/2007 |

OTHER PUBLICATIONS

Gracenote: Playlist, http://www.gracenote.com/business_solutions/playlist/, pp. 1-4, Dec. 12, 2007.

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Apple—iPod classic," http://www.apple.com/ipodclassic/, printed Oct. 26, 2007, 1 page.

Babulous :: Keep it loud, http://www.babulous.com/home.jhtml, copyright 2009 Babulous, Inc., printed Mar. 26, 2009, 2 pages.

Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.

"betterPropaganda—Free MP3s and music videos.," http://www.betterpropaganda.com/, copyright 2004-2005 betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

Cai, Rui et al., "Scalable Music Recommendation by Search," Proc. ACM Multimedia, Augsburg, Germany, Sep. 2007, pp. 1065-1074.

"ChoiceStream Technology Brief, Review of Personalization Technologies: Collaborative Filtering vs. ChoiceStream's Attributized Bayesian Choice Modeling," 13 pages.

"The Classic TV Database—Your Home for Classic TV!—www.classic-tv.com," http://www.classic-tv.com, copyright The Classic TV Database—www.classic-tv.com, printed Feb. 7, 2007, 3 pages.

"Digital Tech Life >> Download of the Week," http://www.digitaltechlife.com/category/download-of-the-week/, printed Feb. 16, 2007, 9 pages.

"MP3 music download website, eMusic," http://www.emusic.com/, copyright 2007 eMusic.com Inc., printed Feb. 7, 2007, 1 page.

"GenieLab::Music Recommendation System," http://web.archive.org/web/20060813000442/http://genielab.com/, copyright 2005 GenieLab, LLC, printed Oct. 26, 2007, 1 page.

"The Daily Barometer—GenieLab.com grants music lovers' wishes," http://media.barometer.orst.edu/home/index.cfm?event=displayArticlePrinterFriendly&uSt..., copyright 2007 The Daily Barometer, printed Feb. 16, 2007, 2 pages.

Jennifer Golbeck, "Trust and Nuanced Profile Similarity in Online Social Networks," available from http://www.cs.umd.edu/~golbeck/publications.shtml, 2008, 30 pages.

"Goombah—Preview," http://www.goombah.com/preview.html, printed Jan. 8, 2008, 5 pages.

"Gracenote Playlist," Revised Dec. 29, 2005, 2 pages.

"Gracenote Playlist Plus," Revised Dec. 29, 2005, 2 pages.

"Gracenote," http://www.gracenote.com, printed Feb. 7, 2007, 1 page.

"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.

Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.

"Identifying iPod models," http://support.apple.com/kb/HT1353, printed Feb. 24, 2010, 13 pages.

"IEEE 802.11—Wikipedia, the free encyclopedia," http://en.wikipedia.org/wiki/IEEE_802.11, printed Oct. 26, 2007, 5 pages.
"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Apple—iPod+iTunes," http://www.apple.com/itunes/, copyright 2007 Paramount Pictures, printed Feb. 7, 2007, 2 pages.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
"last.fm the social music revolution," 1 page.
"Last.fm—Wikipedia, the free encyclopedia," http://en.wikipedia.org/wiki/Last.fm, printed Aug. 8, 2006, 7 pages.
"LimeWire—Wikipedia, the free encyclopedia," http://en.wikipedia.org/wiki/LimeWire, printed Aug. 8, 2006, 2 pages.
"liveplasma music, movies, search engine and discovery engine," http://www.liveplasma.com, printed May 17, 2007, 1 page.
"Loomia—Personalized Recommendations for Media, Content and Retail Sites," http://www.loomia.com/, copyright 2006-2007 Loomia Inc., printed Feb. 7, 2007, 2 pages.
Jeff Mascia et al., "Lifetrak: Music in Tune With Your Life," copyright 2006, 11 pages.
"Mercora—Music Search and Internet Radio Network," http://www.mercora.com/overview.asp, copyright 2004-2006 Mercora, Inc., printed Aug. 8, 2006, 1 page.
"Mercora—Music Search and Internet Radio Network," http://www.mercora.com/v6/_front/web.jsp, printed Feb. 7, 2007, 1 page.
"Outlook Home Page—Microsoft Office Online," http://office.microsoft.com/en-us/outlook/default.aspx, copyright 2007 Microsoft Corporation, printed Nov. 8, 2007, 1 page.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.
MixxMaker: The Mix Tape Goes Online—AppScout, http://www.appscout.com/2008/01/mixxmaker_the_mixtape_goes_onl_1.php, copyright 1996-2009 Ziff Davis Publishing Holdings Inc., printed Aug. 3, 2009, 3 pages.
"Welcome to the Musicmatch Guide," http://www.mmguide.musicmatch.com/, copyright 2001-2004 Musicmatch, Inc., printed Feb. 7, 2007, 1 page.
Tour's Profile, http://mog.com/Tour, copyright 2006-2009 Mog Inc., printed Aug. 3, 2009, 11 pages.
"Mongomusic.com—The Best Download mp3 Resources and Information. This website is for sale!," http://www.mongomusiccom/, printed May 17, 2007, 2 pages.
"Thunderbird—Reclaim your inbox," http://www.mozilla.com/en-US/thunderbird/, copyright 2005-2007 Mozilla, printed Nov. 8, 2007, 2 pages.
"Take a look at the Future of Mobile Music :: Music Guru," http://www.symbian-freak.com/news/006/02/music_guru.htm, copyright 2005 Symbian freak, printed Feb. 7, 2007, 3 pages.
"Music Recommendations 1.0—MacUpdate," http://www.macupdate.com/info.php/id/19575, printed Feb. 16, 2007, 1 page.
"MusicGremlin," http://www.musicgremlin.com/StaticContent.aspx?id=3, copyright 2005, 2006, 2007 MusicGremlin, Inc., printed Oct. 26, 2007, 1 page.
"MusicIP—The Music Search Engine," http://www.musicip.com/, copyright 2006-2007 MusicIP Corporation, printed Feb. 7, 2007, 1 page.
"Digital Music News," http://www.digitalmusicnews.com/results?title=musicstrands, copyright 2003-6 Digital Music News, printed Aug. 8, 2006, 5 pages.
"Musicstrands.com Because Music is Social," copyright 2006 MusicStrands, Inc., 2 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.
"MyStrands Download," http://www.mystrands.com/overview.vm, printed Feb. 7, 2007, 3 pages.
"Napster—All the Music You Want," http://www.napster.com/using_napster/all_the_music_you_want.html, copyright 2003-2006 Napster, LLC, printed Feb. 7, 2007, 2 pages.
"Try Napster free for 7 Days—Play and download music without paying per song.," http://www.napster.com/choose/index.html, copyright 2003-2007 Napster, LLC, printed Feb. 7, 2007, 1 page.
"FAQ," http://blog.pandora.com/faq/, copyright 2005-2006 Pandora Media, Inc., printed Aug. 8, 2006, 20 pages.
"Pandora Internet Radio—Find New Music, Listen to Free Web Radio," http://www.pandora.com/, copyright 2005-2007 Pandora Media, Inc., printed Feb. 7, 2007, 1 page.
"Pandora Radio—Listen to Free Internet Radio, Find New Music," http://www.pandora.com/mgp, copyright 2005-2007 Pandora Media, Inc., printed Oct. 26, 2007, 1 page.
"RYM FAQ—Rate Your Music," http://rateyourmusic.com/faq/, copyright 2000-2007 rateyourmusic.com, printed Nov. 8, 2007, 14 pages.
"Rhapsody—Full-length music, videos and more—FREE," http://www.rhapsody.com/welcome.html, copyright 2001-2007 Listen.com, printed Feb. 7, 2007, 1 page.
Ringo: Social Information Filtering for Music Recommendation, http://jolomo.net/ringo.html, printed Aug. 3, 2009, 1 page.
Badrul M. Sarwar et al., "Recommender Systems for Large-scale E-Commerce: Scalable Neighborhood Formation Using Clustering," 2002, 6 pages.
"Soundflavor," http://www.soundflavor.com/, copyright 2003-2007 Soundflavor, Inc., printed Feb. 7, 2007, 1 page.
"that canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.
"Trillian (software)—Wikipedia, the free encyclopedia," http://en.wikipedia.org/wiki/Trillian_(instant_messenger), printed Nov. 8, 2007, 11 pages.
"uPlayMe.com Meet People, Music Sharing—About Us," http://www.uplayme.com/about.php, copyright 2008 uPlayMe, Inc., printed Mar. 26, 2009, 4 pages.
"uPlayMe.com Meet People, Music Sharing—Home," http://www.uplayme.com/, copyright 2008 uPlayMe, Inc., printed Mar. 26, 2009, 1 page.
"UpTo11.net—Music Recommendations and Search," http://www.upto11.net/, copyright 2005-2006 Upto11.net, printed Feb. 7, 2007, 1 page.
Wang, Jun et al., "Music Recommender System for Wi-Fi Walkman," Delft University of Technology, date unknown, 23 pages.
"Webjay—Playlist Community," http://www.webjay.org/, copyright 2006 Yahoo! Inc., printed Feb. 7, 2007, 5 pages.
"What is the size of your physical and digital music collection?," http://www.musicbanter.com/general-music/47403-what-size-your-physical-digital-music-collection-12.html, printed Feb. 24, 2010, copyright 2010 Advameg, Inc, 6 pages.
"Wired News:," http://www.wired.com/news/digiwoo/1,57634-0.html, copyright 2005 Lycos, Inc., printed Oct. 9, 2006, 3 pages.
"Not safe for work—Wikipedia, the free encyclopedia," http://en.wikipedia.org/wiki/Work_safe, printed Nov. 8, 2007, 2 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
Yahoo! Music downloaded archival page from www.archive.org for Jun. 20, 2005, copyright 2005 Yahoo! Inc., 14 pages.
"Yahoo Music Jukebox—Wikipedia, the free encyclopedia," http://en.wikipedia.org/wiki/Yahoo_music_engine, printed Aug. 8, 2006, 1 page.
"LAUNCHcast Radio—Yahoo! Messenger," http://messenger.yahoo.com/launch.php, copyright 2007 Yahoo! Inc., printed Nov. 8, 2007, 1 page.
"Music Downloads—Over 2 Million Songs_Try It Free_Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.

"Zune.net—How-To—Share Audio Files Zune to Zune," http://web.archive.org/web/20070819121705/http://www.zune.net/en-us/support/howto/z..., copyright 2007 Microsoft Corporation, printed Nov. 14, 2007, 2 pages.

"Hulu—About," www.hulu.com/about/product_tour, copyright 2010 Hulu LLC, printed Jun. 15, 2010, 2 pages.

"SongReference," http://songreference.com/, copyright 2008, SongReference.com, printed Jun. 15, 2010, 1 page.

Nilson, Martin, "id3v2.4.0-frames—ID3.org," http://www.id3.org/id3v2.4.0-frames, Nov. 1, 2000, copyright 1998-2009, printed Jun. 15, 2010, 31 pages.

"Songbird," http://getsongbird.com/, copyright 2010 Songbird, printed Jun. 15, 2010, 2 pages.

* cited by examiner

| PLAY HISTORY ENTRY 400 | GUID 402 | PLAY LOCATION 404 | TIMESTAMP 406 |
|---|---|---|---|

FIG. 7A

(Matrix of $C_{xy}$ values with 1's on the diagonal, axes labeled USERS × USERS)

FIG. 7B

(Matrix of $C_{xy}$ values with 1's on the diagonal, axes labeled MEDIA ITEM × MEDIA ITEM)

| INTERMEDIATE RESULTS 800 ||||||
|---|---|---|---|---|
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |

*FIG. 8*

| MEDIA RECOMMENDATION 46 ||
|---|---|
| CURRENT LOCATION | 502 |
| TERMINATION CONDITION | 510 |
| MEDIA ID 802 | SCORE 810 |
| MEDIA ID 802 | SCORE 810 |
| MEDIA ID 802 | SCORE 810 |
| MEDIA ID 802 | SCORE 810 |
| MEDIA ID 802 | SCORE 810 |
| MEDIA ID 802 | SCORE 810 |
| MEDIA ID 802 | SCORE 810 |
| MEDIA ID 802 | SCORE 810 |
| MEDIA ID 802 | SCORE 810 |
| MEDIA ID 802 | SCORE 810 |

*FIG. 9*

METHOD AND SYSTEM FOR GENERATING MEDIA RECOMMENDATIONS IN A DISTRIBUTED ENVIRONMENT BASED ON TAGGING PLAY HISTORY INFORMATION WITH LOCATION INFORMATION

BACKGROUND

Systems for sharing and generating playlists are known. For example Gracenote Playlist™ by Gracenote® of Emeryville, Calif., offers playlist generation technology for automatically generating digital music playlists that works in offline devices, including portable MP3 players, as well as desktop applications.

Gracenote Playlist Plus™ allows a user to generate a More Like This™ playlist by selecting one or more songs, albums, or artists as seeds songs, e.g., of a song that is currently playing. Gracenote Playlist then returns a mix of music that contains music from related artists and genres. This is accomplished by Playlist Plus analyzing text data available in file tags, called metadata, and filenames of the music to link the music to an internal database of music information. Playlist Plus uses the Gracenote's proprietary metadata types, which includes a genre system that has more than 1600 individual genre categories and associated relational data. The system lets Playlist Plus find relationships between songs that may be missed by simpler systems. For example, a "Punk Pop" song may be more similar to a "Ska Revival" song than it might be to one belonging to another "Punk" sub-category, such as "Hardcore Punk."

Last.fm Ltd. is a UK-based internet radio and music community website. Using a music recommendation system called "Audioscrobbler", Last.fm™ builds a profile of each user's musical taste by recording details of all the songs the user listens to, either on streamed radio stations or on the user's own computer or music player. This information is transferred to Last.fm's database ("Scrobbled") via a plugin installed into the users' music player. The profile data is displayed on the user's Last.fm profile page for others to see. The site offers numerous social networking features and can recommend and play artists similar to the user's favorites. Users can create custom radio stations and playlists from any of the audio tracks in Last.fm's music library. A user can embed a playlist in their profile page for others to listen, but the playlist needs to have at least 15 streamable tracks, each from different artists.

Similarly, U.S. Pat. No. 7,035,871 B2 entitled "Method and Apparatus for Intelligent and Automatic Preference Detection of Media Content" provides a system for listening to music online by creating a preference profile for a user. When the user signs up for the service and provides details reflecting his preferences and his play history, a preference profile is generated and stored in a preference database. The system analyses the stored profiles in the database and learns from the patterns it detects. The system recommends music to the user with attributes similar to user's play history.

Patent application publication 2006/0143236 A1 entitled "Interactive Music Playlist Sharing System and Methods" describes a community media playlist sharing system, where system users upload media playlists in real-time, and which are automatically converted to a standardized format and shared with other users of the community. A playlist search interface module browses the database of media playlists and returns similar playlists of system users based on similarity of one or more of the following inputs from a system user: media identification information, media category information, media relations information, user information, or matching a plurality of media items on respective playlists. Based on the results of the playlist search interface module, the system returns a list of recommended playlists to the user.

Although conventional systems for generating playlists perform for their intended purposes, conventional systems suffer disadvantages that may render the results overbroad for the user's tastes. One disadvantage is that although conventional systems may take into account the playlists of other users, conventional systems fail to analyze the playlists of a specific group of users, and fail to consider peer group influences. For example, the music that a particular teenager listens to may be highly influenced by the music listened to by a group of the teenager's peers, such as his or her friends. A further disadvantage is that conventional systems fail to take into account the fact that the music tastes of a user may be influenced by his or her geographic location when generating playlists.

BRIEF SUMMARY

The exemplary embodiment provides a computer-implemented method and system for generating media recommendations in a media recommendation network. Aspects of the method and system include receiving by a server a plurality of play histories of media items from a plurality of users of devices, wherein at least a portion of the media items are tagged with corresponding time and location data indicating a time and location of play; receiving by the server a media recommendation request from a requester, including receiving seed information indicating a current location of the requester; using at least one of user preferences of the requester and the seed information to identify correlated users from which to search corresponding play histories from among the plurality of play histories; comparing the seed information to the corresponding play histories and generating a list of related media items contained therein; and returning the list of related media items to the requester.

BRIEF DESCRIPTION OF SEVERAL VIEWS OF THE DRAWINGS

FIG. 7A is a diagram showing results of a computation for correlated users represented pictorially in a table.

FIG. 7B is a diagram showing results of a computation for correlated media items represented pictorially in a table.

FIG. 8 a block diagram illustrating an intermediate results table for the list of related media items.

FIG. 9 is a diagram illustrating a media recommendation.

DETAILED DESCRIPTION

The present invention relates to methods and systems for generating media recommendations. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain blocks. However, the method and system operate effectively for other methods having different and/or additional blocks not inconsistent with the present invention.

The present invention relates generally to a method and system for generating media recommendations, such as a list of songs, in response to a user's request for the play histories of other users. A central server of a media service stores and continuously updates the play histories of multiple users. In response to receiving a media recommendation request from a requester and seed information provided from the requester, such as the requester's location, a request processor of the central server identifies correlated users for the requester based on user preferences and the seed information. The seed information is then compared to the play histories of the correlated users. Weights may be assigned to media items in the play histories of the correlated users based on various parameters. The media items are then ranked based on weighted scores and then presented to the requester.

Figure 1:
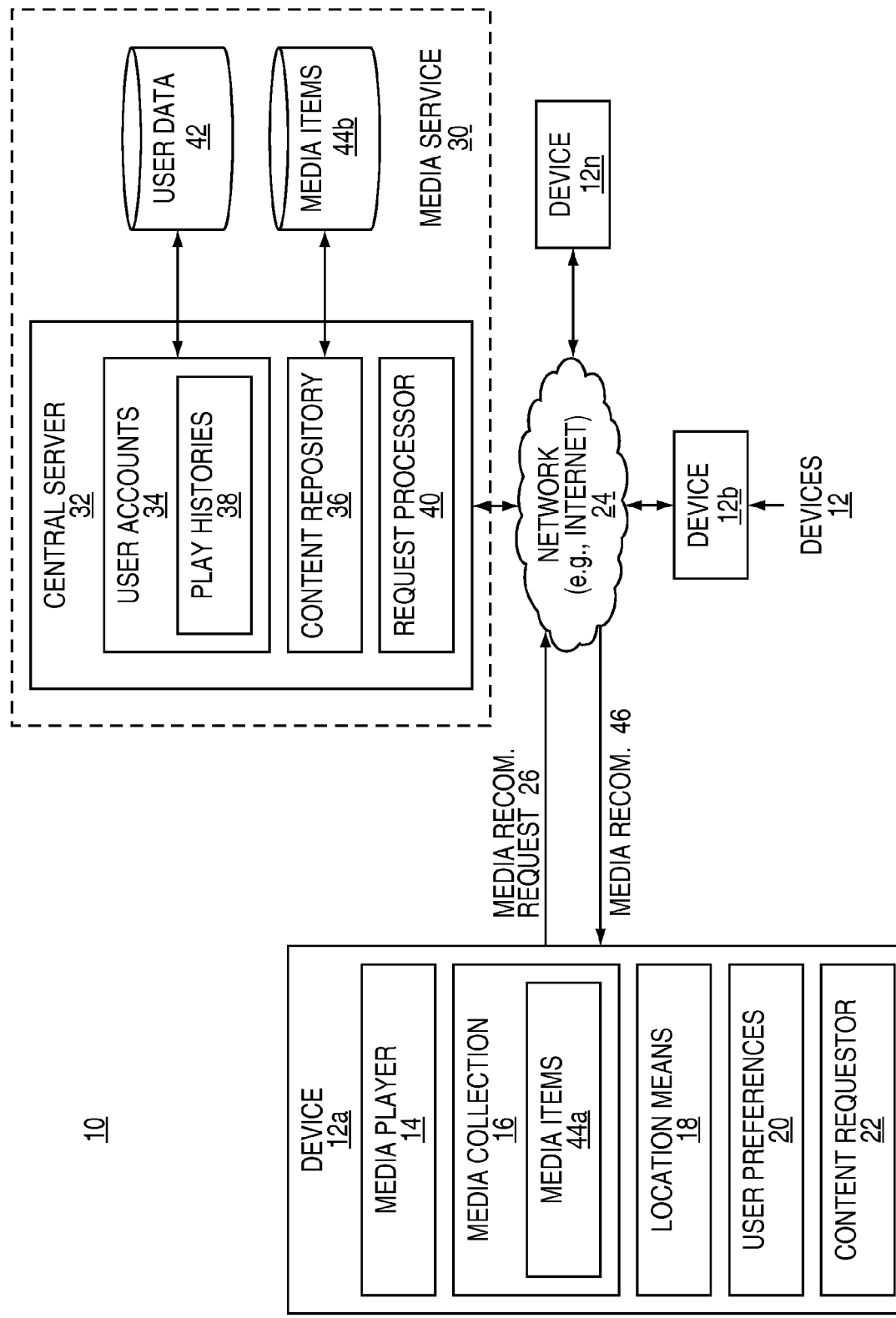
FIG. 1 illustrates a system for generating media recommendations in a distributed media network according to one embodiment.

FIG. 1 illustrates a system 10 for generating media recommendations in a distributed media network according to one embodiment. In general, the system 10 includes a number of devices 12a, 12b, and 12n (collectively referred to as devices 12) that are capable of presenting or playing media items and communicating with a media service, such as, but not limited to, an Internet radio service, via a network 24, such as, but not limited to, the Internet. The media service 30 may have at least one central server 32 connected to the network 24, and a content repository 36.

Each of the devices 12 may include a media player 14, a media collection 16, a location means 18, user preferences 20, and a content requester 22. In one embodiment, the media player 14 may operate to play media items from either the media collection 16 or the content repository 36. The media items 44a from media collection 16 and the media items 44b from the content repository 36 are collectively referred to herein as media items 44.

Note that while the exemplary embodiments may discuss media items 44 in terms of being songs, e.g., mp3s, for clarity and ease of discussion, the term media items 44 is equally applicable to other types of media, such as digital images, slideshows, audio books, digital books, and video presentations, for example. Exemplary video presentations are movies, television programs, music videos, and the like.

In one embodiment, the devices 12 may form a peer-to-peer (P2P) network via the network 24 as described in co-pending application Ser. No. 11/484,130 entitled "P2P Network for Providing Real Time Media Recommendations", filed on Jul. 11, 2006, which is incorporated herein by reference in its entirety. In one embodiment, the devices 12 may form a P2P network through direct communication with one another, while in another embodiment, the devices 12 may form a P2P network via the media service 30. The devices 12 may be any device having a connection to the network 24 and media playback capabilities. For example, the devices 12 may be personal computers, laptop computers, mobile telephones, portable media players, PDAs, or the like having either a wired or wireless connection to the network 24.

The media collection 16 may include any number of media items 44a stored in one or more digital storage units such as, for example, one or more hard-drives, flash memories, memory cards, internal Random-Access Memory (RAM), external digital storage devices, or the like. The user preferences 20 may comprise attributes defining preferences with respect to media items and listening habits, described further below.

The location means 18 may comprise software and/or hardware that singularly or in combination with a remote device is capable of determining a location or position of the device 12. In one embodiment, the location means 18 comprises a hardware device, such as a global positioning system (GPS) sensor, for instance. In another embodiment, the location means comprises components, such as software on the central server 32 capable of determining an Internet protocol (IP) address of the device 12 and for then determining a location from the IP address. In another embodiment, the location means comprises software and/or hardware capable of determining the location of the device 12 based on cell tower triangulation.

As media items 44 are played on the device 12, either from the media collection 16 or streamed over the network 24, the device 12 may generate one or more play histories 38 of the media items 44 that were played, whether the device 12 is online or offline. According to the exemplary embodiment, the play histories 38 of the device 12 may be tagged with time and location data indicating the time and the location that each of the media items 44 were played. Both the play histories 38 and the user preferences 20 may be periodically, or by request, provided to the central server 32 once the device 12 connects with the central server 32.

Either the media player 14 or the content requester 22 can be configured to tag the play histories 38 with the time and location data. And either the media player 14 the content requester 22 can be configured to provide the play histories 38 and the user preferences 20 to the central server 32, though not necessarily at the same time or at the same frequency. Alternatively, a user of the device 12 may provide the user preferences 20 to the media service 30 over the Internet via a Web browser. The media player 14 and the content requester 22 may be implemented in software, hardware, or a combination of hardware and software. The content requester 22 may alternatively be incorporated into the media player 14.

The central server 32 may host user accounts 34 and a request processor 40. The user accounts 34 may maintain information regarding users of the media service 30 in the form of user data 42, including their uploaded user preferences 20 and play histories 38. The users of the media service 30 preferably correspond to the users of the devices 12. The content repository 36 may maintain media information about any number of media items 44. For example, the media information may include genre, title, release date, band name, genre, country of origin, location of live performances, and the like. In one embodiment, the media service 30 may make the media items 44 available over the network 24 via streaming.

In operation, the content requester 22 of the device 12 sends a media recommendation request 26 from the device 12 to the media service 30. The media recommendation request 26 may be sent with seed information, such as the device's current location. In response to receiving the media recommendation request 26, the request processor 40 computes a result by first correlating a group of user accounts 34 to consider for the computation, then mining the play histories 38 from the correlated user accounts to generate a media recommendation 46 containing a list of one or more related media items 44 substantially matching the seed information, e.g., the device's current location. This process is described below.

Figure 2:
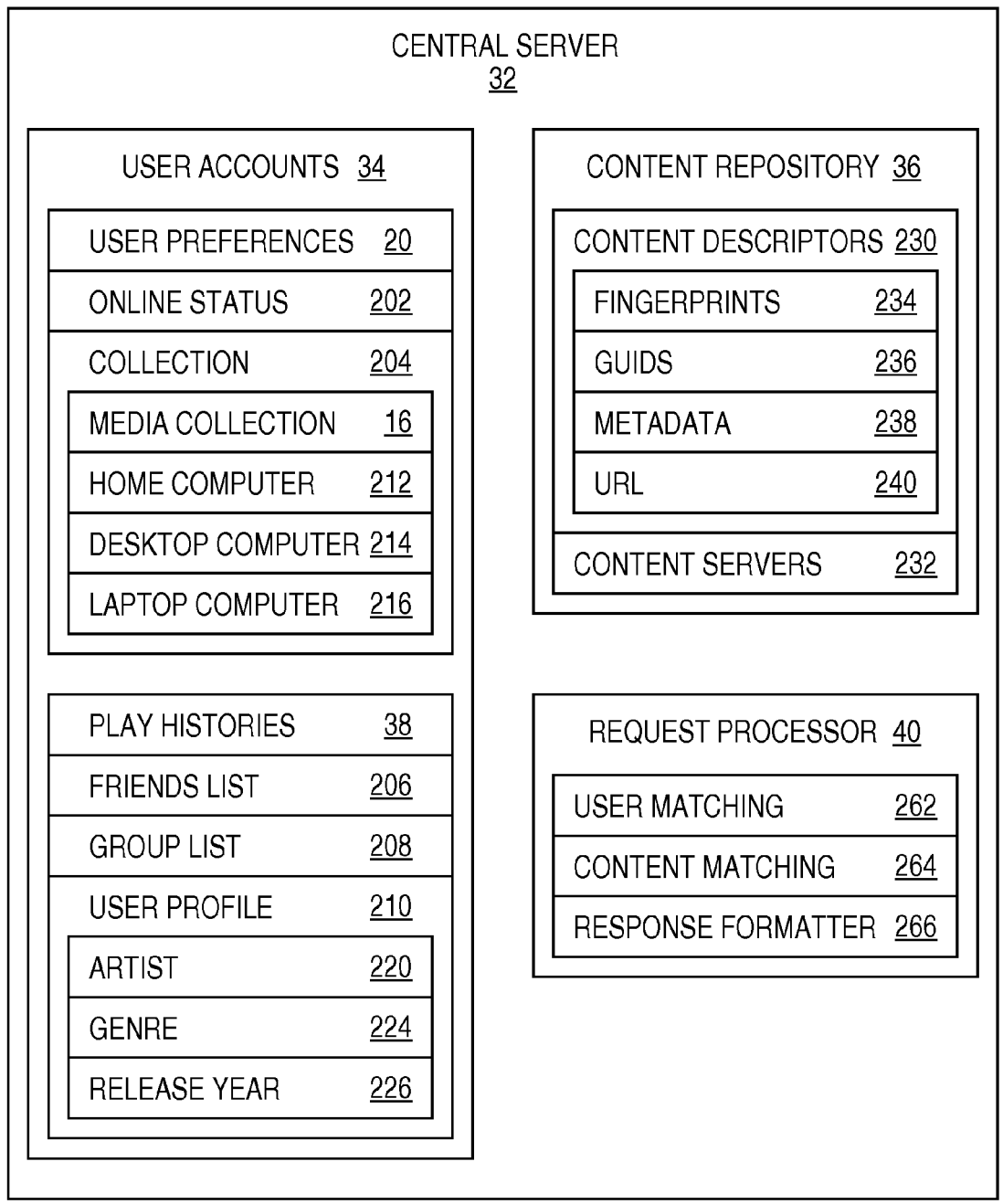
FIG. 2 is a diagram illustrating exemplary components of the central server 32 in further detail according to one embodiment.

FIG. 2 is a diagram illustrating exemplary components of the central server 32 in further detail according to one embodiment. The user account 34 maintained by the server for each user may include the following; user preferences 20, an online status 202, collection information 204, the user's play histories 38, a friends list 206, a group list 208, and a user profile 210.

The user preferences 20 may be used by the media player 14 and the central server 32 to select the order that media items are played for the user depending on whether the media items are being played locally on the device 12, or streamed from the media service 30, respectively. The user preferences 20 may include a weight or priority assigned to each of a number of categories such as user, genre, decade of release, and location/availability. Generally, the location/availability may identify whether songs are stored locally in the media collection 16; available via the media service 30; available for download, and optionally purchase, from an e-commerce service or one of the other devices 12b, 12n; or are not currently available where the user may search for the songs if desired. The user preferences 20 may be stored locally at the device 12 and/or the central server 32. If the device 12 is a portable device, the user preferences may be configured on an associated user system, such as a personal computer, and transferred to the device 12 during a synchronization process. The user preferences may alternatively be automatically provided or suggested by the media service 30 based on a play history of the device 12.

The online status 202 may be used to store a value indicating whether the user is currently online and logged into the media service 30.

The collection information 204 may include a record of each new media item collected by the user including those stored in the media collection 16 of the device 12, any home computer 212, desktop computer 214, or laptop computer 216 the user logs in from. The collection information 204 is segregated based on the machine on which it resides. That is, the media player 14 running as a client on a machine provides information about the media items found on the machine and provides a machine identifier for that machine to the central server 32. The collection information 204 may be collected and stored for each of these machines separately.

As described above, the play histories 38 are time and location tagged records of each of the media items played by the user 220. The friends list 206 is a list of users that the user wishes to receive recommendations from, and the group list 208 is a list of groupings of those friends, which may identify peer groups.

The user profile 210 includes statistics about the user's collection such as artist distribution 220, genre distribution 224, and release year distribution 226, for example.

The content repository 36 may include content descriptors 230 and content servers 232. The content servers 232 host and serve the media items 44. The content descriptors 230 may contain information identifying each media item 44 known by the central server 32, including a media fingerprint 234, a Globally Unique Identifier or GUID 236, metadata 238 for the media item 44, and a URL 240 that indicates the file locations on the content servers 232.

The request processor 40 may coordinate a user matching component 262, a content matching component 264, and a response formatter component 266, which functions as described below to generate and provide media recommendations to the device 12.

Figure 3:
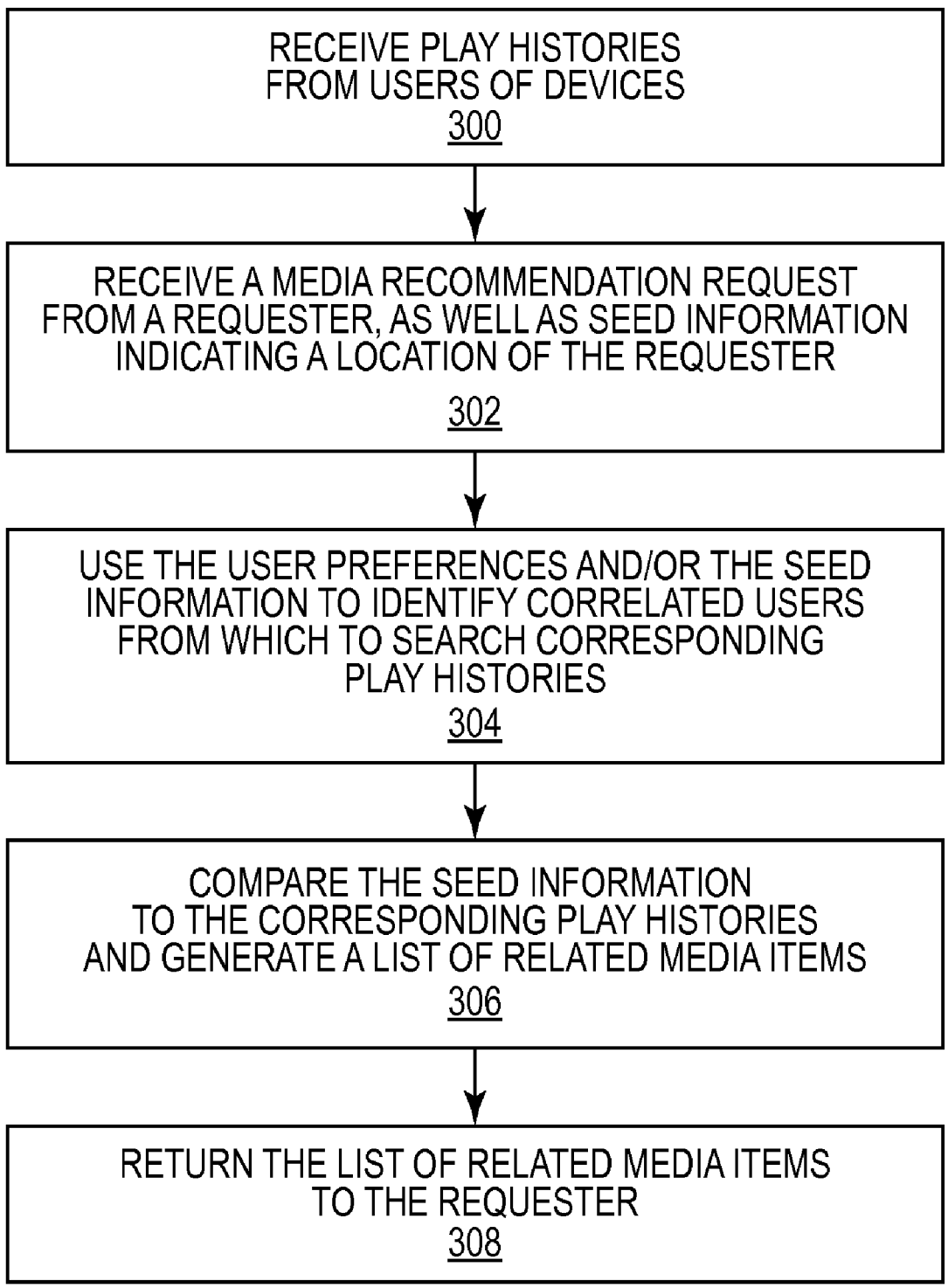
FIG. 3 is a flow diagram illustrating a process for generating media recommendations according to one embodiment of the present invention.

FIG. 3 is a flow diagram illustrating a process for generating media recommendations according to one embodiment of the present invention. The process begins by the central server 32 receiving a plurality of play histories 38 of media items from the users of devices 12, where the media items listed in the play histories 38 are tagged with corresponding time and location data indicating a time and location of play (block 300).

Figures 4, 5:
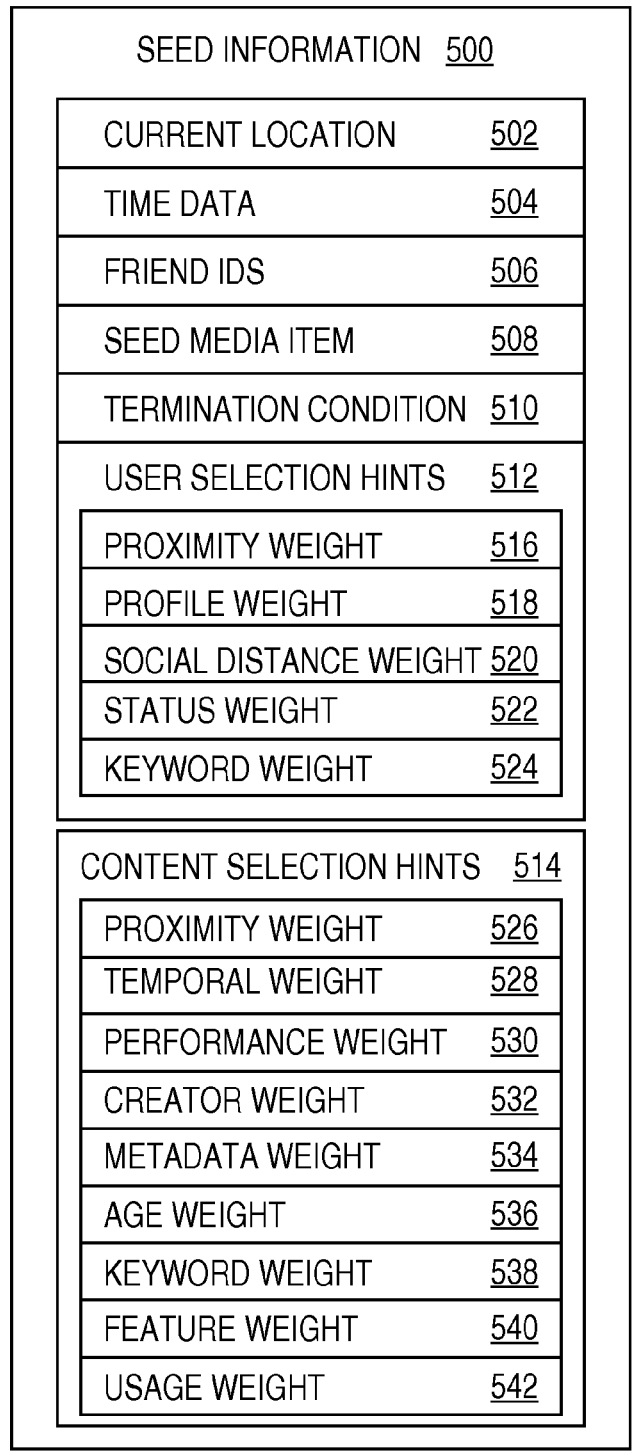
FIG. 4 is a block diagram illustrating an exemplary play history entry.
FIG. 5 is a block diagram illustrating exemplary seed information sent with the media recommendation request.

FIG. 4 is a block diagram illustrating a play history entry. The exemplary play history entry 400 includes a GUID 402 for identifying the media item, and a play location 404 and a timestamp 406 indicating the location and time of play, respectively. The play location 404 and a timestamp 406 may be of any format. For example, the play location 404 may comprise a GPS coordinate (latitude & longitude), an address, a ZIP code, a city, a neighborhood, and the like. The timestamp 406 may include the calendar date and time of day in Greenwich Mean Time (GMT), for example.

Referring again to FIG. 3, the central server 32 receives a media recommendation request 26 from a requester, including receiving seed information indicating a current location of the requester (block 302).

In one embodiment, the media recommendation request 26 may include the seed information. In another embodiment, the seed information may be sent to the central server 32 as additional information apart from the media recommendation request 26.

In response to receiving the media recommendation request 26, a component of the media service 30, such as the request processor 40, uses the user preferences 20 of the requester and/or the seed information to identify correlated users from which to search corresponding play histories from among the plurality of play histories 38 (block 304). In another embodiment, the seed information could be used to search the play histories 38 first, followed by a matching of the user preferences.

The seed information is then compared to the corresponding play histories and a list of related media items contained therein is generated (block 306). The list of related media items is then returned to the requester as a media recommendation 46 (block 308). Once received by the device 12, the media player 14 may automatically play the media items listed in the media recommendation 46.

In a further embodiment, the seed information 500 includes time data in addition to the current location of the requester, such that the media items in the play histories 38 may be correlated based at least in part on the current location of the requester and the time data from the seed information. Any internal or external time device of the device 12 may be suitable for including the time data in the seed information 500.

FIG. 5 is a block diagram illustrating exemplary seed information sent with the media recommendation request 26. According to the exemplary embodiment, the request processor 40 performs a two step process during the computation of related media items for the requester and uses the seed information 500 sent with the media recommendation request 26 during both steps to: 1) filter and correlate users and therefore the play histories 38; and 2) filter the play histories of the correlated users.

In one embodiment, the seed information 500 may comprise any combination of current location 502, time data 504, friend IDs 506, one or more seed media items 508, a termination condition 510, user selection hints 512, and content selection hints 514.

The current location 502 indicates the requesting device's current location. The time data 504 is another value that may be used to filter the play histories 38 to correlate the media items during media recommendation generation. The time data may indicate the time that the device 12 sent the media recommendation request 26. The time data 504 may also represent a different value. For example, the time data may be used to indicate a time cut-off value such that media items are selected that have timestamps 406 indicating the media items were played after the cut-off value (i.e., are newer). The current location 502 and the time data 504 may be formatted as described above with respect to the play location 404 and a timestamp 406.

The friends IDs 506 may be a list of user ID's of friends that the requester specifies that may be used to filter the play histories 38 to narrow which play histories 38 are searched. The seed media item 508 may be a seed song (preferably, just the metadata from the song), for example, that is used to find similar media items during media recommendation generation. The termination condition 510 may specify a number of media items to return in the media recommendation 46 and an optional time out condition.

The user selection hints 512 and the content selection hints 514 include user changeable values expressed as methods that may be used to control computation of which media items are recommended. Values for the current location 502, the time data 504, and friend IDs 506 may be used as inputs for values used in some of the methods of the user selection hints 512 and the content selection hints 514.

The user selection hints 512 are methods for correlating or filtering user accounts 34 (and therefore the users) to consider during the first step of the computation of selecting related media items for the requester. The user selection hints 512 ensure that only the play histories 38 of user accounts 34 having user preferences 20 closely correlated to the requester are searched for media recommendations.

In one embodiment, the user selection hints 512 may include a proximity weight 516, a profile weight 518, a social distance weight 520, a status weight 522, and a keyword weight 524. The proximity weight 516 searches only the play histories 38 of the users of devices 12 within proximity of the requester. This proximity can be calculated by determining if a last known current location 502 of the user's device 12 is within a threshold distance from the current location 502 of the requester's device 12.

The profile weight 518 searches the play histories 38 of the users that have user preferences less than a minimum distance between the requester's user preferences based on a profile matching scheme. The social distance weight 520 searches only the play histories 38 of the users within N steps of the requester within a social network. The status weight 522 searches only the play histories 38 of those users who have a current status of "online". The keyword weight 524 searches the play histories 38 of the users having keywords matching keywords provided by the requester.

The content selection hints 514 are methods of filtering the play histories 38 of the correlated users during the second step of the computation of selecting related media items for the requester to determine which media items will be considered. The content selection hints 514 may include a proximity weight 526, a temporal weight 528, a performance weight 530, a creator weight 532, a metadata weight 534, an age weight 536, a keyword weight 538, a feature rate 540, and a usage rate 542. The proximity weight 526 selects media items having a play location 404 within proximity of the current location 502 of the requester. Proximity can be calculated based on a threshold distance and may be configurable based on the specific application.

The temporal weight 528 selects media items having a time of access, as indicated via timestamp 406, which matches within a time threshold of the time data 504 specified in the seed information 500. The performance weight 530 selects media items having a live performance location within proximity of the current location 502 of the requester.

The creator weight 532 selects media items having groups who created the media items that were located within proximity of the current location of the media recommendation request. The metadata weight 534 selects media items having metadata that matches a criteria provided by the requester, such as genre, decade and the like. The age weight 536 selects media items having a time lapse since the media items were last accessed that matches a criteria provided by the requester. The keyword weight 538 selects media items having keywords matching keyword criteria provided by the requester. The feature weight 540 selects media items having specified features extracted from the media item and stored as metadata. The usage weight 542 contains information regarding how often the media item has been played and may be used as a usage histogram.

Figure 6:
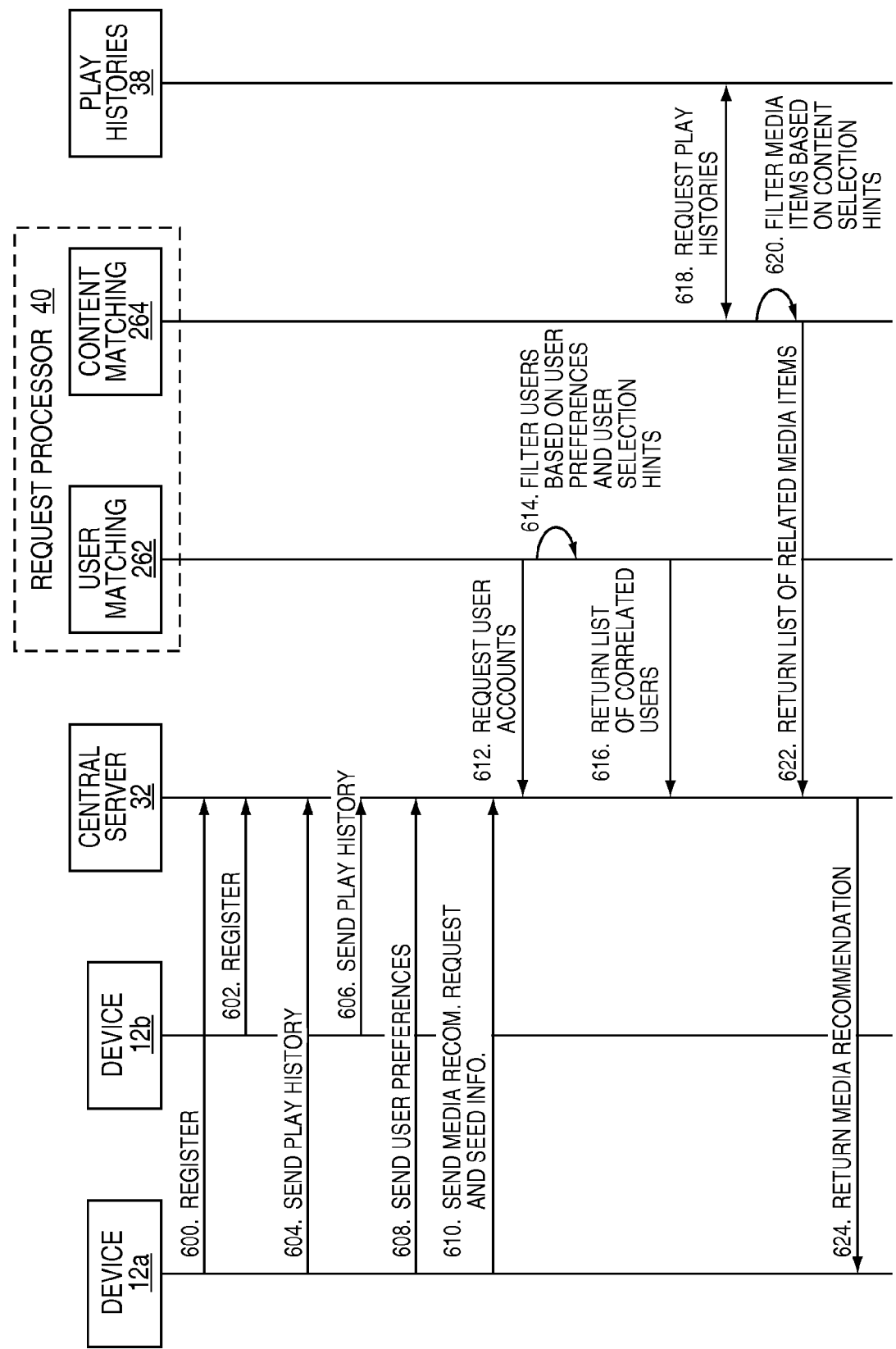
FIG. 6 is a flow diagram illustrating operation of the system for generating the media recommendations in response to media recommendation request in further detail.

FIG. 6 is a flow diagram illustrating operation of the system 10 for generating the media recommendations 46 in further detail. In this embodiment, the process begins with the devices 12a and 12b registering with a central server 32 (blocks 600 and 602). Registration may include the users of the devices 12a and 12b establishing accounts and becoming members of the media service 30 and uploading information identifying their respective devices 12a and 12b.

Device 12a may then send its play history 400 to the central server 32 (block 604), and device 12b may send its play history 400 to the central server 32 (block 606). As described above, the central server 32 stores the play histories 38 in association with the user accounts 34 of the users of the devices 12a and 12b. Device 12a may also send its user preferences 20 to the central server 32 (block 608).

Sometime thereafter, device 12a may send a media recommendation request 26 and the seed information 500 to the central server 32 (block 610), which is then passed to the request processor 40. The user matching component 262 of the request processor 40 first requests the user accounts 34 from the central server 32 (block 612). In response to receiving the user accounts 34, the user matching component 262 filters the user accounts 34 based on the user preferences 20 and the user selection hints 512. That is, an evaluation function is used to compare the user preferences 20 and the user selection hints 512 sent from the device 12a with the user account 34 information of the other users and to compute a correlation between the users. The result of the computation for correlated users is represented pictorially in the table shown in FIG. 7A. The user matching component 262 ranks the items in the table, and returns the items having the highest correlation and in a list of correlated users to the central server 32 (block 616).

Next, the content matching component 264 of the request processor 40 requests the play histories 38 of the correlated users (block 618). In response to receiving the play histories 38 of the correlated users, the content matching component 264 filters the media items listed in the play histories 38 based on the content selection hints 514 from the seed information 500 (block 620). That is, the content matching component 264 uses an evaluation function to compare the content selection hints 514 with information regarding the media items 44 listed in the play histories 38 to compute the correlation between related or matching media items. The result of the computation for correlated media items is represented pictorially in the table shown in FIG. 7B. The content matching component 264 ranks the items in the table, and returns the items having the highest correlation and returns a list of related media items to the central server 32 (block 622).

The central server 32 then returns the list of related media items to the requesting device 12 as a media recommendation 46 (block 624).

In one embodiment, the list of correlated users (block 616) and the list of related media items (block 622) are processed into an intermediate results table, and then formatted into the media recommendation 46 by the response formatter 266 of the request processor 40.

FIG. 8 a block diagram illustrating an intermediate results table for the list of related media items; and FIG. 9 is a diagram illustrating the media recommendation 46.

Referring to FIG. 8, entries in the intermediate results table 800 may include a media ID 802 identifying the media item, a user ID 804 of the user from which the media item was recommended, a user weight 806, a media item weight 808, and a score 810. The user weight 806 represents a correlation value representing the degree of correlation between the requester and the corresponding user, as calculated in table 7A. These correlation values are also influenced by the user weighting hints supplied in 512. In the case where optional Friend IDs 506 are explicitly supplied, the group of users specified in the Friend IDs 506 are the only users considered in the computation of 7A. The media item weight 808 represents a correlation value representing the degree of correlation between the optional seed media item 508 and the corresponding media items, as calculated in table 7B. When the requester does not supply a seed media item 508 is not supplied, a theoretical seed media item profile may be constructed from the content selection hints 514, and the correlation values in table 7B are in relation to this theoretical seed. The score 810 represents a function of the user weight 808 and the media item weight 808.

Once the intermediate results table 800 has been completed, the central server 32 sorts the entries according to the score 810, and removes any duplicates using media item IDS 802.

As shown in FIG. 9, the top N scoring media items are then formatted into media recommendation 46 and returned to the requesting device 12. In one embodiment, the media recommendation 46 includes the media ID 802 and the score 810. The media recommendation 46 may optionally include at least a portion of the original seed information 500, such as the current location 502 and the termination condition 510.

In one embodiment, the media ID 802 comprises information identifying the media item, such as a Globally Unique Identifier (GUID) for the song, a title of the song, or the like; a Uniform Resource Locator (URL) enabling other devices to obtain the song such as a URL enabling download or streaming of the song from the media service 30 or a URL enabling purchase and download of the song from an e-commerce service; a URL enabling download or streaming of a preview of the song from the media service 30 or a similar e-commerce service; metadata describing the song such as ID3 tags including, for example, genre, the title of the song, the artist of the song, the album on which the song can be found, the date of release of the song or album, the lyrics, and the like. Alternatively the media recommendation 46 may also include the user IDs 804 of the users from which the related media items were recommended.

Figure 10:
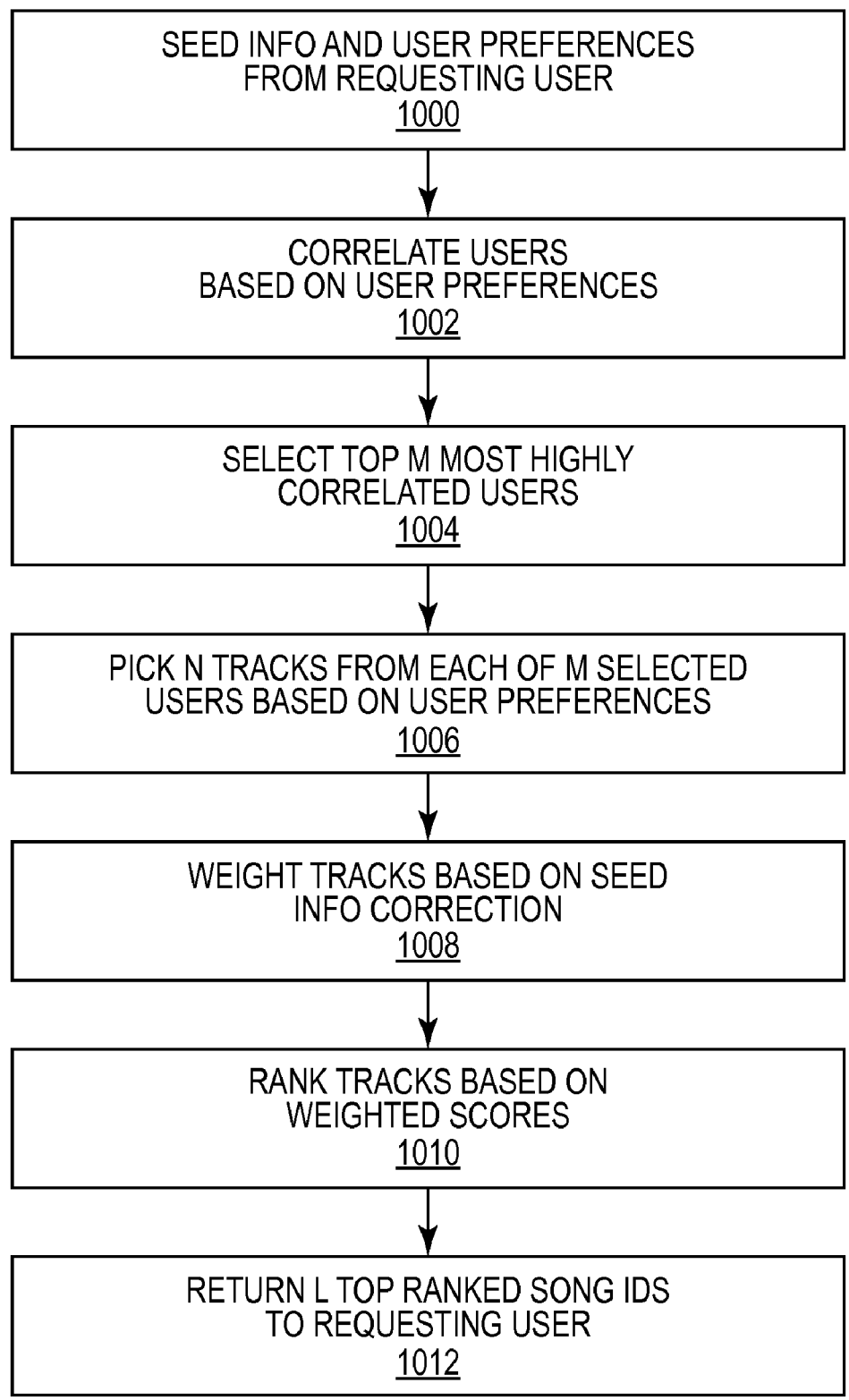
FIG. 10 is a flow diagram illustrating a process for generating a media recommendation in an environment where the media items are songs.

FIG. 10 is a flow diagram illustrating a process for generating a media recommendation 46 in an environment where the media items are songs. The process begins by central server 32 receiving the seed information 500 and the user preferences 20 from the requesting user (block 1000). The user accounts 34 are then correlated based on the user preferences 20 (block 1002). The top M most highly correlated users are then selected (block 1004). This corresponds to block 614 from FIG. 6.

Next, N songs from each of the M correlated users are selected based on the user preferences 20 (block 1006). In one embodiment, N may represent the N most frequently played songs from the play histories 38 of each of the M correlated users. Weights are assigned to the selected songs based on seed information 500 (block 1008). Seed information fields 502, 504, 506, and 510 may all be optional, but at least one must be specified. Thereafter, the weighted songs are ranked based on the assigned weights (block 1010). Blocks 1006 through blocks 1010 correspond to block 620 from FIG. 6.

The central server 32 then returns the L top ranked song IDs to the requesting user as the media recommendation 46 (block 1012).

A method and system for generating a media recommendation has been disclosed. The present invention has been described in accordance with the embodiments shown, and one of ordinary skill in the art will readily recognize that there could be variations to the embodiments that would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

We claim:

1. A computer-implemented method for generating a media recommendation, comprising:

receiving by a server from a plurality of user devices a plurality of play histories of media items played by a plurality of users, wherein each play history of the plurality of play histories indicates media items played by a corresponding one of the plurality of users and is tagged with time and location of play for each of at least a portion of the media items indicated in the play history;

receiving by the server a media recommendation request from a requester, including receiving seed information, wherein the received seed information indicates a current location of the requester;

identifying correlated users among the plurality of users by using at least one user preference of the requester and the received seed information in order to search corresponding play histories from among the plurality of play histories that correspond to the identified correlated users;

comparing the received seed information to the corresponding play histories and generating a list of related media items from the corresponding play histories; and
returning the list of related media items to the requester.

2. The computer-implemented method of claim 1 wherein receiving the seed information further comprises receiving time data, and using the time data to correlate the media items in the corresponding play histories.

3. The computer-implemented method of claim 2 further comprising correlating the media items in the corresponding play histories based on the current location of the requester and the time data from the seed information.

4. The computer-implemented method of claim 3 wherein the time data represents one of a time that the media recommendation request was sent, and a time cut-off value, wherein the time cut-off value is used to select media items having corresponding time and location data that indicate the media items were played after the time cut-off value.

5. The computer-implemented method of claim 1 wherein receiving the seed information further comprises receiving a list of user ID's of friends specified by the requester that is used to filter the plurality of play histories.

6. The computer-implemented method of claim 1 wherein receiving the seed information further comprises receiving a seed media item that is used to find similar media items during generation of the media recommendation.

7. The computer-implemented method of claim 1 wherein receiving the seed information further comprises receiving a termination condition that specifies a number of media items to return in the media recommendation.

8. The computer-implemented method of claim 1 wherein receiving the seed information further comprises receiving user selection methods for correlating the plurality of the users.

9. The computer-implemented method of claim 8 wherein the user selection methods include a proximity weight that searches only the play histories of the users within proximity of the requester.

10. The computer-implemented method of claim 8 wherein the user selection methods include a profile weight that searches only the play histories of the users that have user preferences less than a minimum distance between the requester's at least one user preference based on a profile matching scheme.

11. The computer-implemented method of claim 8 wherein the user selection methods include a social distance weight that searches only the play histories of the users within N steps of the requester within a social network.

12. The computer-implemented method of claim 8 wherein the user selection methods include a status weight that searches only the play histories of those users who have a current status of "online".

13. The computer-implemented method of claim 1 wherein receiving the seed information further comprises receiving content selection methods for filtering the play histories.

14. The computer-implemented method of claim 13 wherein the content selection methods include a proximity weight that selects the media items having a play location within proximity of the current location of the requester.

15. The computer-implemented method of claim 13 wherein the content selection methods include a temporal weight that selects the media items having a time of access that matches within a time threshold of time data specified in the seed information.

16. The computer-implemented method of claim 13 wherein the content selection methods include a performance weight that selects the media items having a live performance location within proximity of the current location of the requester.

17. The computer-implemented method of claim 13 wherein the content selection methods include a creator weight that selects the media items having groups who created the media items that were located within proximity of the current location of the media recommendation request.

18. The computer-implemented method of claim 13 wherein the content selection methods include an age weight that selects the media items having a time that lapse since the media items were last accessed that matches a criteria provided by the requester.

19. A system comprising
a plurality of devices; and
a media service in communication with the plurality of devices, the media service comprising a server, and a content repository; wherein the server is functional for:
receiving from the plurality of user devices a plurality of play histories of media items played by a plurality of users, wherein each play history of the plurality of play histories indicates media items played by a corresponding one of the plurality of users and is tagged with time and location of play for each of at least a portion of the media items indicated in the play history;
receiving a media recommendation request from a requester, including receiving seed information, wherein the received seed information indicates a current location of the requester;
identifying correlated users among the plurality of users by using at least one user preference of the requester and the received seed information in order to search corresponding play histories from among the plurality of play histories that correspond to the identified correlated users;
comparing the received seed information to the corresponding play histories and generating a list of related media items from the corresponding play histories; and
returning the list of related media items to the requester.

20. The system of claim 19 wherein the seed information further comprises time data that is used to correlate the media items in the corresponding play histories.

21. The system of claim 20 wherein the media items in the corresponding play histories are correlated based on the current location of the requester and the time data from the seed information.

22. The system of claim 21 wherein the time data represents one of a time that the media recommendation request was sent, and a time cut-off value, wherein the time cut-off value is used to select media items having corresponding time and location data that indicate the media items were played after the time cut-off value.

23. The system of claim 19 wherein the seed information further comprises a list of user ID's of friends specified by the requester that is used to filter the plurality of play histories.

24. The system of claim 19 wherein the seed information further comprises a seed media item that is used to find similar media items during generation of the media recommendation.

25. The system of claim 19 wherein the seed information further comprises a termination condition that specifies a number of media items to return in the media recommendation.

26. The system of claim 19 wherein the seed information further comprises user selection methods for correlating the plurality of the users.

27. The system of claim 26 wherein the user selection methods include a proximity weight that searches only the play histories of the users within proximity of the requester.

28. The system of claim 26 wherein the user selection methods include a profile weight that searches only the play histories of the users that have user preferences less than a minimum distance between the requester's at least one user preference based on a profile matching scheme.

29. The system of claim 26 wherein the user selection methods include a social distance weight that searches only the play histories of the users within N steps of the requester within a social network.

30. The system of claim 26 wherein the user selection methods include a status weight that searches only the play histories of those users who have a current status of "online".

31. The system of claim 19 wherein receiving the seed information further comprises receiving content selection methods for filtering the play histories.

32. The system of claim 31 wherein the content selection methods include a proximity weight that selects the media items having a play location within proximity of the current location of the requester.

33. The system of claim 31 wherein the content selection methods include a temporal weight that selects the media items having a time of access that matches within a time threshold of time data specified in the seed information.

34. The system of claim 31 wherein the content selection methods include a performance weight that selects the media items having a live performance location within proximity of the current location of the requester.

35. The system of claim 31 wherein the content selection methods include a creator weight that selects the media items having groups who created the media items that were located within proximity of the current location of the media recommendation request.

36. The system of claim 31 wherein the content selection methods include an age weight that selects the media items having a time lapse since the media items were last accessed that matches a criteria provided by the requester.

* * * * *